United States Patent
Yamada et al.

(10) Patent No.: US 12,430,533 B2
(45) Date of Patent: Sep. 30, 2025

(54) NEURAL NETWORK PROCESSING APPARATUS, NEURAL NETWORK PROCESSING METHOD, AND NEURAL NETWORK PROCESSING PROGRAM

(71) Applicant: MAXELL, LTD., Kyoto (JP)

(72) Inventors: Takato Yamada, Tokyo (JP); Antonio Tomas Nevado Vilchez, Tokyo (JP)

(73) Assignee: MAXWELL, INC., Kyoto (JP)

( * ) Notice: Subject to any disclaimer, the term of this patent is extended or adjusted under 35 U.S.C. 154(b) by 982 days.

(21) Appl. No.: 17/283,922

(22) PCT Filed: Sep. 10, 2019

(86) PCT No.: PCT/JP2019/035492
§ 371 (c)(1),
(2) Date: Apr. 8, 2021

(87) PCT Pub. No.: WO2020/075433
PCT Pub. Date: Apr. 16, 2020

(65) Prior Publication Data
US 2021/0232894 A1    Jul. 29, 2021

(30) Foreign Application Priority Data
Oct. 10, 2018 (JP) ................. 2018-192021

(51) Int. Cl.
*G06N 3/063* (2023.01)
*G06N 3/04* (2023.01)
(Continued)

(52) U.S. Cl.
CPC ....................... *G06N 3/04* (2013.01)

(58) Field of Classification Search
CPC .......... G06N 3/04; G06N 3/045; G06N 3/063; G06F 17/10
See application file for complete search history.

(56) References Cited

U.S. PATENT DOCUMENTS 5,255,347 A * 10/1993 Matsuba ................ G06N 3/045
706/31
5,847,952 A * 12/1998 Samad ................ G05B 13/027
700/48
(Continued)

FOREIGN PATENT DOCUMENTS

CN    101018196 A    8/2007
CN    107636697 A    1/2018
(Continued)

OTHER PUBLICATIONS

Office Action received for Chinese Patent Application No. 201980066531.1, mailed on Oct. 27, 2023, 17 pages (8 pages of English Translation and 9 pages of Original Document).
(Continued)

*Primary Examiner* — Jordany Nunez
(74) *Attorney, Agent, or Firm* — WOMBLE BOND DICKINSON (US) LLP

(57) ABSTRACT

A CNN processing apparatus (1) includes an input buffer (10) configured to store an input signal A given to a CNN, a weight buffer (11) configured to store weights U, a convolutional operation unit (12) configured to perform a convolutional operation including a product-sum operation of the input signal A and the weights U, a storage unit 16 configured to store a table (160) which is configured to associate an input and an output of conversion-quantization processing with each other, wherein the input is an operation result of the convolutional operation, and the output is a result of the conversion-quantization processing of converting the input value based on a predetermined condition and quantizing the converted value by reducing a bit accuracy of the converted data, and a processing unit (14) configured to acquire the output of the conversion-quantization processing
(Continued)

corresponding to the operation result by the operation unit by referring to the table (160).

8 Claims, 5 Drawing Sheets

(51) Int. Cl.
*G06N 3/045* (2023.01)
*G06N 3/065* (2023.01)

(56) References Cited

U.S. PATENT DOCUMENTS

| | | | | |
|---|---|---|---|---|
| 6,389,404 | B1* | 5/2002 | Carson | G06N 3/063 |
| | | | | 706/18 |
| 10,740,432 | B1* | 8/2020 | Diamant | G06N 3/045 |
| 2002/0059152 | A1* | 5/2002 | Carson | G06N 3/063 |
| | | | | 706/20 |
| 2002/0181799 | A1* | 12/2002 | Matsugu | G06V 10/94 |
| | | | | 382/260 |
| 2006/0242257 | A1 | 10/2006 | Kuribayashi | |
| 2007/0183326 | A1 | 8/2007 | Igarashi et al. | |
| 2011/0239032 | A1 | 9/2011 | Kato et al. | |
| 2016/0179434 | A1 | 6/2016 | Herrero Abellanas et al. | |
| 2016/0328646 | A1 | 11/2016 | Lin et al. | |
| 2016/0328647 | A1 | 11/2016 | Lin et al. | |
| 2017/0277977 | A1 | 9/2017 | Kitamura | |
| 2018/0032866 | A1 | 2/2018 | Son et al. | |
| 2018/0046903 | A1 | 2/2018 | Yao et al. | |
| 2018/0211152 | A1 | 7/2018 | Migacz et al. | |
| 2018/0247182 | A1 | 8/2018 | Motoya et al. | |
| 2018/0253641 | A1 | 9/2018 | Yachide et al. | |
| 2019/0251424 | A1 | 8/2019 | Zhou et al. | |
| 2022/0292337 | A1* | 9/2022 | Tian | G06F 17/16 |
| 2023/0004790 | A1* | 1/2023 | Kang | G06N 3/063 |
| 2023/0162013 | A1* | 5/2023 | Terashima | G06N 3/08 |
| | | | | 708/290 |

FOREIGN PATENT DOCUMENTS

| | | |
|---|---|---|
| CN | 108230277 A | 6/2018 |
| CN | 108345939 A | 7/2018 |
| CN | 108364061 A | 8/2018 |
| EP | 1819105 A1 | 8/2007 |
| JP | 06-259585 A | 9/1994 |
| JP | 07-248841 A | 9/1995 |
| JP | 11-039274 A | 2/1999 |
| JP | 2002-342308 A | 11/2002 |
| JP | 2006-154992 A | 6/2006 |
| JP | 2006-301894 A | 11/2006 |
| JP | 2007-214795 A | 8/2007 |
| JP | 2010-041457 A | 2/2010 |
| JP | 2010-134697 A | 6/2010 |
| JP | 2017-174039 A | 9/2017 |
| JP | 2018-135069 A | 8/2018 |
| JP | 2018-142049 A | 9/2018 |
| JP | 2018-147182 A | 9/2018 |
| WO | 2018/101275 A1 | 6/2018 |
| WO | 2018/140294 A1 | 8/2018 |

OTHER PUBLICATIONS

Hideki Aso et al., "Deep Learning", Kindaikagaku-sha, Nov. 2015.
Hirose et al., "Reduction of memory capacity of deep neural networks by deatomisation", Incorporated Electronic Information Communication Engineers, vol. 117, No. 45, May 22-24, 2017, pp. 39-44 (English Abstract Submitted).
Office Action received for Japanese Patent Application No. 2021-079516, mailed on Mar. 29, 2022, 8 pages (4 pages of English Translation and 4 pages of Office Action).
Notice of Reasons for Refusal received for Japanese Patent Application No. 2021-079516, mailed on Nov. 1, 2022, 8 pages (5 pages of English Translation and 3 pages of Original Document).
Yuri et al., "The concept for Yasuhiko Nakajima and the distributed neural network by edge computing", IEICE Technical Report, Japan, general incorporated foundation Institute of Electronics, Information and Communication Engineers, May 15, 2017, vol. 117, No. 44, 25 pages.
He et al., "Deep residual learning for image recognition", In Proc. of CVPR, Dec. 2015, pp. 1-12.
International Preliminary Report on Patentability received for PCT Patent Application No. PCT/JP2019/035492, mailed on Apr. 22, 2021, 16 pages (10 pages of English Translation and 6 pages of Original Document).
International Search Report and Written Opinion received for PCT Patent Application No. PCT/JP2019/035492, mailed on Nov. 26, 2019, 18 pages (10 pages of English Translation and 8 pages of Original Document).
Office Action received for Japanese Patent Application No. 2020-504046, mailed on Oct. 22, 2020, 13 pages (6 pages of English Translation and 7 pages of Office Action).
Notice of Reasons for Refusal received for Japanese Patent Application No. 2021-079516, mailed on Apr. 9, 2024, 34 pages (21 pages of English Translation and 13 pages of Original Document).
Office Action received for Chinese Patent Application No. 201980066531.1, mailed on Apr. 7, 2024, 16 pages (9 pages of English Translation and 7 pages of Original Document).

* cited by examiner

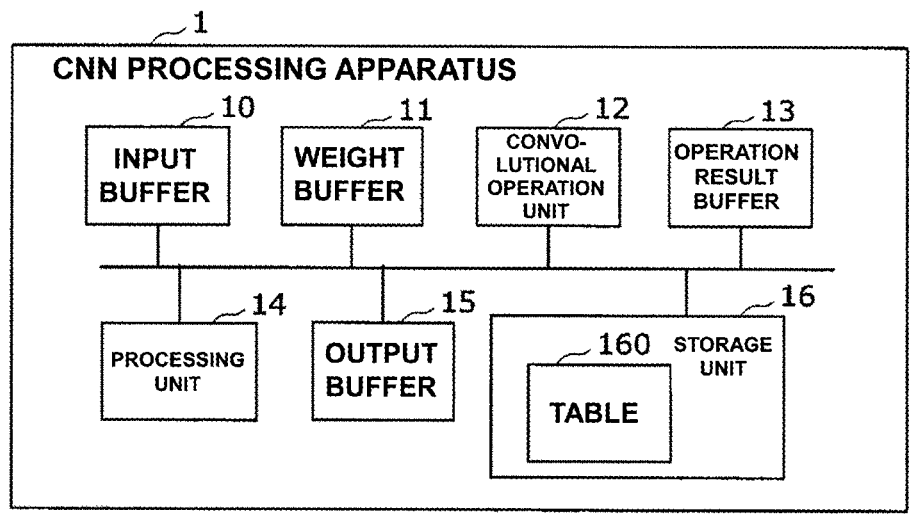
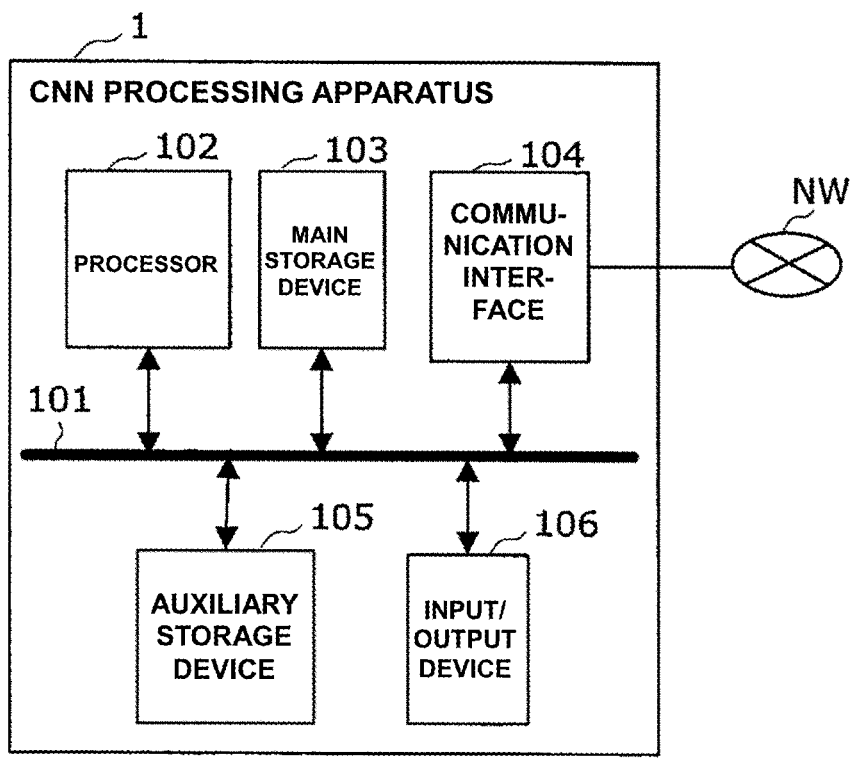

FIG. 3
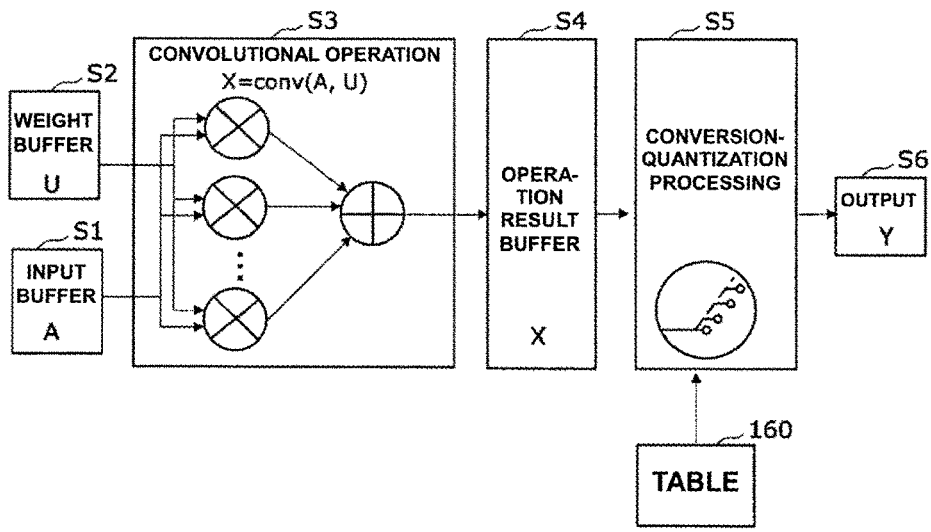
FIG. 4
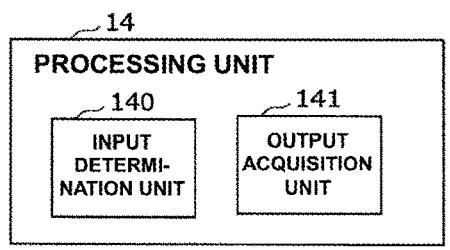
FIG. 5
| INPUT x | OUTPUT y |
|---|---|
| $x<1$ | 0 |
| $1 \leq x<2$ | 2 |
| $2 \leq x<3$ | 3.5 |
| $3 \leq x<4$ | 5.7 |
| $4 \leq x$ | 7 |
FIG. 6
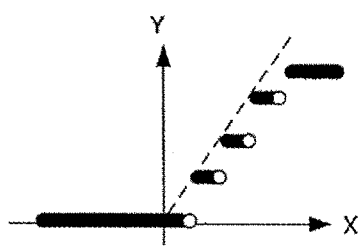

FIG. 7
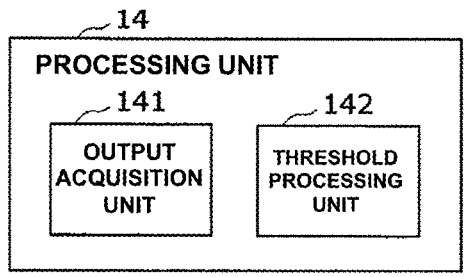
FIG. 8
| THRESHOLD | OUTPUT y |
|---|---|
| 1 | 0 |
| 2 | 2 |
| 3 | 3.5 |
| 4 | 5.7 |
| 5 | 7 |
FIG. 9
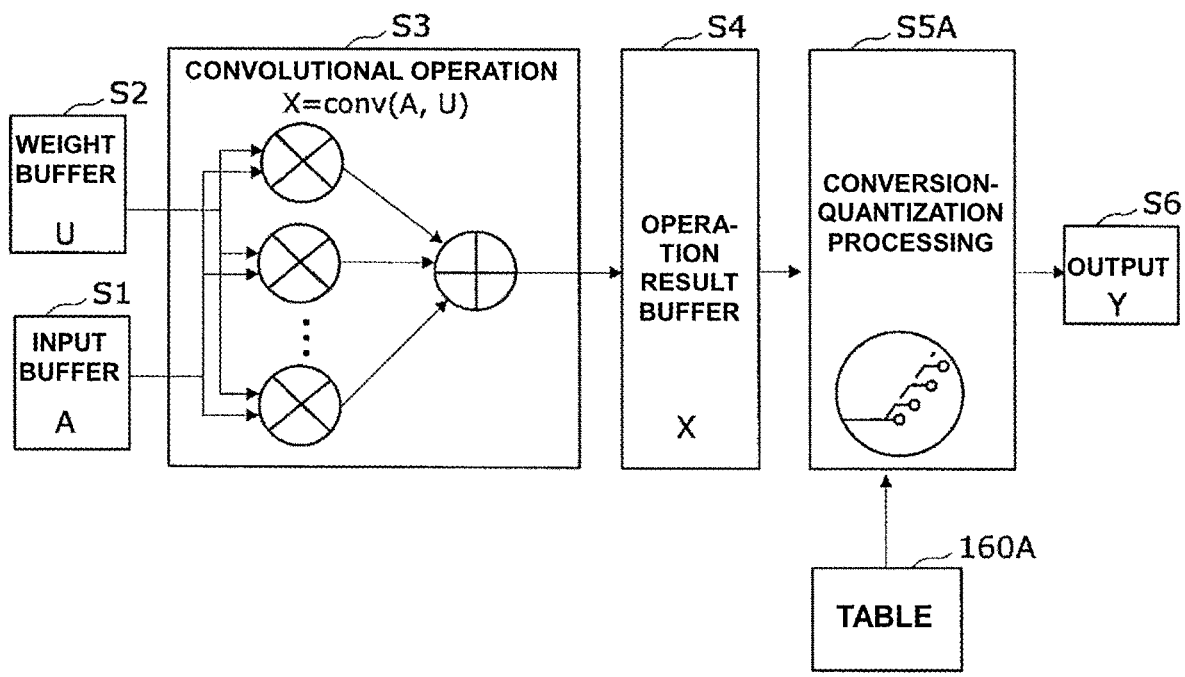

FIG. 10
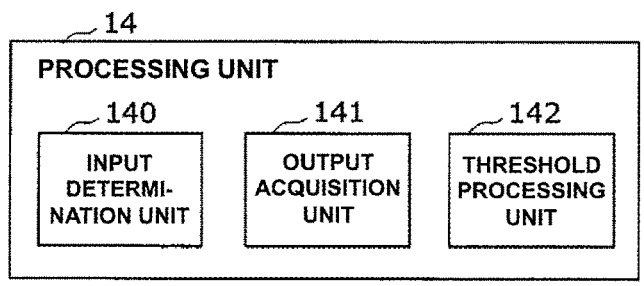
FIG. 11
| INPUT x | THRESH-OLD | OUTPUT y |
|---|---|---|
| x < 6 | 1 | 0 |
| | 2 | 2 |
| | 3 | 3 |
| | 4 | 5.7 |
| | 5 | 7 |
| 6 ≦ x < 10 | 6 | 6.1 |
| | 7 | 3 |
| | 8 | -1 |
| | 9 | -3 |
FIG. 12
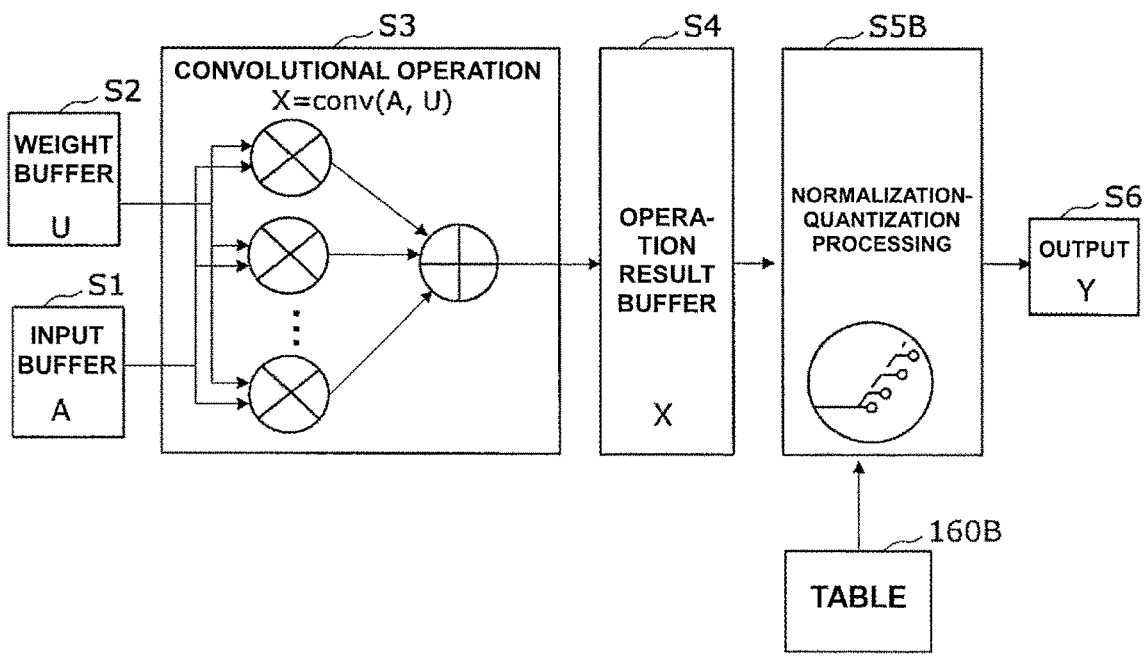

NEURAL NETWORK PROCESSING APPARATUS, NEURAL NETWORK PROCESSING METHOD, AND NEURAL NETWORK PROCESSING PROGRAM

TECHNICAL FIELD

The present invention relates to a neural network processing apparatus, a neural network processing method, and a neural network processing program.

BACKGROUND ART

In recent years, as a deep neural network used to classify images into a plurality of categories, a convolutional neural network (CNN) has received attention. The CNN is characterized by including a convolution layer in a deep neural network. The convolution layer applies a filter to input data. More specifically, in the convolution layer, the window of the filter is slid by a predetermined stride, and a product-sum operation of multiplying an element of the filter by a corresponding filter of input data and obtaining the sum of products is performed.

FIG. 13 is a view showing the procedure of signal processing of a general CNN. The CNN includes an input layer, and an intermediate layer, and an output layer (see, for example, non-patent literature 1 and non-patent literature 2). In the intermediate layer, a convolutional operation of multiplying an input layer by weights is performed.

As shown in FIG. 13, in the intermediate layer, detection processing by ReLU (Rectified Linear Units) or normalization such as BN (Batch Normalization) (to be sometimes generically referred to as "conversion" hereinafter) is performed as needed for the result of a convolutional operation. In some cases, pooling processing is performed.

The feature of an input signal extracted via the convolutional operation is input to a classifier formed by a fully connected layer, and the classification result is output from the output layer. As described above, one of the features of a neural network such as a CNN is that a product-sum operation and a conversion operation are repetitively performed.

The input value of input data or weights used in the CNN sometimes includes a decimal point. In the product-sum operation of a conventional neural network such as a CNN, arithmetic processing is performed while ensuring the number of digits of an operation result, as indicated by the values of "input signal", "weights", and "convolutional operation" in FIG. 13. As described above, in a conventional neural network such as a CNN, in the intermediate layer formed by multiple layers, or the like, a number of arithmetic processes are necessary for a number of input values with a large number of digits.

RELATED ART LITERATURE

Non-Patent Literature

Non-Patent Literature 1: K. He, X. Zhang, S. Ren, and J. Sun, "Deep residual learning for image recognition. In Proc. of CVPR, 2016. (*ResNet)

Non-Patent Literature 2: Hideki Aso et al., "Deep Learning", Kindaikagaku-sha, November 2015

DISCLOSURE OF INVENTION

Problem to be Solved by the Invention

However, when the conventional neural network such as a CNN is implemented by embedded hardware such as an FPGA (Field Programmable Gate Array) or a microcomputer, the calculation resource is limited. For this reason, the processing speed of a number of arithmetic processes for a number of input values with a large number of digits lowers.

The present invention has been made to solve the above-described problem, and has as its object to provide a neural network processing apparatus capable of suppressing lowering of the processing speed of a neural network even if embedded hardware is used, and a neural network processing method.

Means of Solution to the Problem

In order to solve the above-described problem, there is provided a neural network processing apparatus comprising a first memory configured to store an input signal given to a neural network, a second memory configured to store weights of the neural network, an operation unit configured to perform a convolutional operation of the neural network including a product-sum operation of the input signal and the weights, a third memory configured to store a table which is configured to associate an input and an output of conversion-quantization processing with each other, wherein the input is an operation result of the convolutional operation by the operation unit, and the output is a result of the conversion-quantization processing of converting the input value based on a predetermined condition and quantizing the converted value by reducing a bit accuracy of the converted data, and a processing unit configured to acquire the output of the conversion-quantization processing corresponding to the operation result by the operation unit by referring to the table.

In order to solve the above-described problem, there is also provided a neural network processing method comprising a first step of storing an input signal given to a neural network in a first memory, a second step of storing weights of the neural network in a second memory, a third step of performing a convolutional operation of the neural network including a product-sum operation of the input signal and the weights, a fourth step of storing, in a third memory, a table which is configured to associate an input and an output of conversion-quantization processing with each other, wherein the input is an operation result of the convolutional operation in the third step, and the output is a result of the conversion-quantization processing of converting the input value based on a predetermined condition and quantizing the converted value by reducing a bit accuracy of the converted data, and a fifth step of acquiring the output of the conversion-quantization processing corresponding to the operation result in the third step by referring to the table.

In order to solve the above-described problem, there is also provided a neural network processing program configured to cause a computer to execute a first step of storing an input signal given to a neural network in a first memory, a second step of storing weights of the neural network in a second memory, a third step of performing a convolutional operation of the neural network including a product-sum operation of the input signal and the weights, a fourth step of storing, in a third memory, a table which is configured to associate an input and an output of conversion-quantization processing with each other, wherein the input is an operation result of the convolutional operation in the third step, and the output is a result of the conversion-quantization processing of converting the input value based on a predetermined condition and quantizing the converted value by reducing a bit accuracy of the converted data, and a fifth step of acquiring the output of the conversion-quantization processing corresponding to the operation result in the third step by referring to the table.

Effect of the Invention

According to the present invention, since the output of conversion-quantization processing corresponding to an operation result of a convolutional operation is acquired by referring to a table which is configured to associate the input and the output of the conversion-quantization processing of converting the operation result of the convolutional operation based on a predetermined condition and quantizing the converted value by reducing a bit accuracy of the converted data with each other. It is therefore possible to suppress lowering of the processing speed of a neural network even if embedded hardware is used.

BRIEF DESCRIPTION OF DRAWINGS

FIG. 1 is a block diagram for explaining the outline of the function of a CNN processing apparatus according to an embodiment of the present invention;

FIG. 2 is a block diagram showing the hardware arrangement of the CNN processing apparatus according to the embodiment of the present invention;

FIG. 3 is a view for explaining the outline of the procedure of a CNN processing method according to the embodiment of the present invention;

FIG. 4 is a block diagram for explaining the function of a processing unit according to the first embodiment;

FIG. 5 is a view for explaining the arrangement of a table according to the first embodiment;

FIG. 6 is a view for explaining the function of the processing unit according to the first embodiment;

FIG. 7 is a block diagram for explaining the function of a processing unit according to the second embodiment;

FIG. 8 is a view for explaining the arrangement of a table according to the second embodiment;

FIG. 9 is a view for explaining the procedure of a CNN processing method according to the second embodiment;

FIG. 10 is a block diagram for explaining the function of a processing unit according to the third embodiment;

FIG. 11 is a view for explaining the arrangement of a table according to the third embodiment;

FIG. 12 is a view for explaining the procedure of a CNN processing method according to the third embodiment.

BEST MODE FOR CARRYING OUT THE INVENTION

Figure 13:
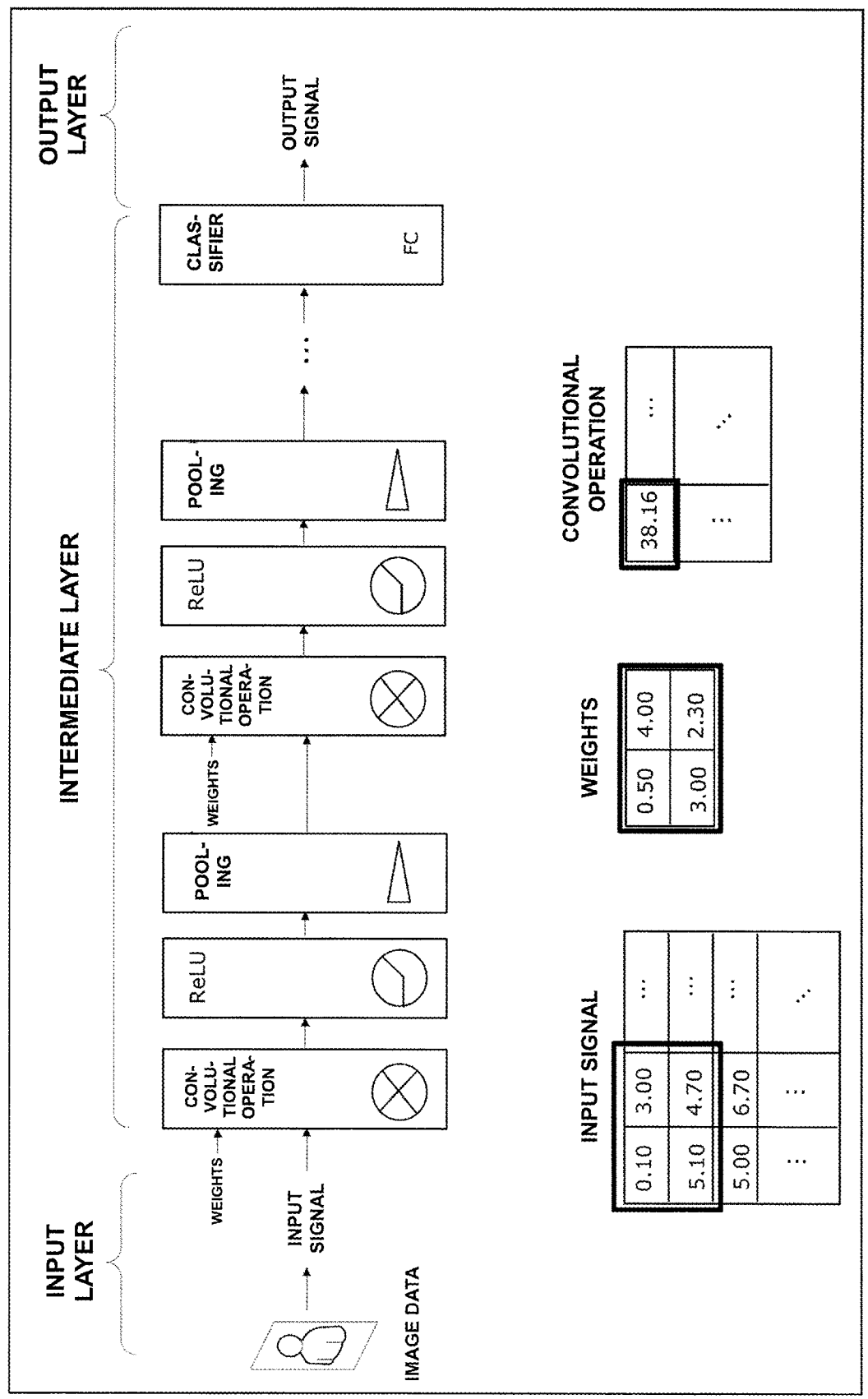
FIG. 13 is a view for explaining arithmetic processing of a conventional CNN.

Preferred embodiments of the present invention will now be described in detail with reference to FIGS. 1 to 12.
[Outline of CNN Processing Apparatus]
A neural network processing apparatus according to the present invention is a CNN processing apparatus 1 using a CNN as a neural network.

The CNN processing apparatus 1 according to this embodiment is an arithmetic processing apparatus that performs a product-sum operation of an input signal given to the CNN and the weights of the CNN, outputs an operation result, and also converts the result of the product-sum operation by applying an ReLU to the operation result. This arithmetic processing includes a product-sum operation (to be sometimes referred to as a "convolutional operation" hereinafter) of a convolution layer in an intermediate layer of the CNN, and a conversion operation of converting the operation result of the convolutional operation based on a predetermined condition. Note that as an example of "conversion", a case in which an ReLU is applied to the operation result of a convolutional operation will be described below.

The CNN processing apparatus 1 performs a convolutional operation of an input signal and weights, and obtains the output of one convolution layer by applying an ReLU to the operation result.

For the descriptive convenience, assume that an operation result calculated by applying an ReLU to the result of the product-sum operation of a convolution layer is used as the input signal of the next convolution layer. The CNN processing apparatus 1 repetitively performs a product-sum operation of an input signal and weights and a conversion operation, thereby executing the product-sum operation and conversion processing as many times as the number of convolution layers held by a CNN model set in advance.
[Functional Blocks of CNN Processing Apparatus]
The above-described CNN processing apparatus 1 includes an input buffer (first memory) 10, a weight buffer (second memory) 11, a convolutional operation unit (operation unit) 12, an operation result buffer 13, a processing unit 14, an output buffer 15, and a storage unit (third memory) 16.

The input buffer 10 is a memory that stores an input signal given to the CNN. More specifically, the input buffer 10 is implemented by a main storage device 103 to be described later, and image data and the like given from the outside are stored in the input buffer 10. The input signal given to the input buffer 10 may be image data that has undergone preprocessing in advance. Examples of preprocessing are monochrome conversion, contrast adjustment, and brightness adjustment. The input signal may be reduced such that it has a bit depth set in accordance with a CNN model set in advance in the CNN processing apparatus 1.

As the value of the input signal given to the input buffer 10, for example, a value including a decimal point and expressed by an array of a floating point number of 32-bit or 16-bit accuracy, or a value obtained by reducing these values to a preset bit number expression is used.

The weight buffer 11 is a memory that stores the weights of the CNN. More specifically, the weight buffer 11 is implemented by the main storage device 103 to be described later, and the weight parameters of the CNN, which is stored in the storage unit 16 or a server (not shown) installed outside the CNN processing apparatus 1, is loaded into the weight buffer 11. In this embodiment, as the value of the weights, a value including a decimal point and expressed by an array of a floating point number of 32-bit or 16-bit accuracy, or a value obtained by reducing these values to a preset bit number expression is used.

The convolutional operation unit 12 performs a convolutional operation of the CNN, including a product-sum operation of the input signal stored in the input buffer 10 and the weights stored in the weight buffer 11. More specifically, the convolutional operation unit 12 reads out the input signal and the weights from the input buffer 10 and the weight buffer 11, respectively, and performs a convolutional operation according to the convolution layer that forms the CNN model set in advance in the CNN processing apparatus 1. The operation result output from the convolutional operation unit 12 is supplied to the operation result buffer 13.

The operation result buffer 13 buffers the result of the convolutional operation by the convolutional operation unit 12.

The processing unit 14 refers to a table 160 stored in the storage unit 16, and outputs a result of performing conversion and quantitation processing (to be sometimes referred to as "conversion-quantization processing" hereinafter) for the result of the convolutional operation read out from the operation result buffer 13. More specifically, the processing unit 14 reads out the convolutional operation result stored in the operation result buffer 13, and acquires and outputs a value corresponding to the input of conversion-quantization processing by referring to the table 160 that stores the input/output relationship of the conversion-quantization processing.

Conversion of the result of the convolutional operation, for example, includes application of an activation function such as an ReLU or normalization using BN or the like, and means converting the operation result of the convolutional operation based on a predetermined condition. The activation function decides the operation result of the convolutional operation.

The ReLU applied to the result of the convolutional operation is a ramp function for converting the result of the convolutional operation to 0 if it is a negative value or converting the result of the convolutional operation to a linearly transformed value if it is a positive value. As described above, the input/output relationship of processing such as a ReLU that converts the operation result of the convolutional operation is determined in advance.

On the other hand, to reduce the operation load, the value obtained by converting the operation result of the convolutional operation via the ReLU or the like is quantized by reducing bit accuracy. Quantization of data, for example, includes well-known fraction processing such as rounding, rounding-up, rounding-down, and rounding to the nearest even number, and means applying a limit by, for example, converting the value obtained by converting the result of the convolutional operation via the ReLU, for example, a value including a decimal point into an integer.

The processing unit 14 refers to the table 160 in which, for example, the input to the ReLU, that is, the result of the product-sum operation and a value obtained by further quantizing the output of the ReLU are stored in association with each other. Hence, the processing unit 14 can execute the conversion processing of the operation result of the convolutional operation by the ReLU and the quantization processing together.

That is, the processing unit 14 acquires a value obtained by two arithmetic processes, that is, the conversion processing of the result of the convolutional operation by the ReLU or the like and the quantization processing by referring to the table 160.

The output buffer 15 temporarily stores the output acquired by the processing unit 14.

The storage unit 16 includes the table 160. The storage unit 16 stores the output from the processing unit 14, which is temporarily stored in the output buffer 15.

The table 160 stores an input and an output of conversion-quantization processing in association with each other. More specifically, the table 160 stores data in which an input of predetermined conversion processing such as an ReLU and an output obtained by quantizing, by preset fraction processing, the value converted by the ReLU are associated with each other.

[Hardware Arrangement of CNN Processing Apparatus]

An example of the hardware arrangement of the CNN processing apparatus 1 having the above-described functions will be described next with reference to the block diagram of FIG. 2.

As shown in FIG. 2, the CNN processing apparatus 1 can be implemented by, for example, a computer including a processor 102, the main storage device 103, a communication interface 104, an auxiliary storage device 105, and an input/output device 106, which are connected via a bus 101, and a program configured to control these hardware resources.

A program to be used by the processor 102 to perform various kinds of control and operations is stored in the main storage device 103 in advance. By the processor 102 and the main storage device 103, the functions of the CNN processing apparatus 1 including the convolutional operation unit 12 and the processing unit 14 shown in FIG. 1 are implemented.

By the main storage device 103, the input buffer 10, the weight buffer 11, the operation result buffer 13, and the output buffer 15 described with reference to FIG. 1 are implemented.

The communication interface 104 is an interface circuit configured to perform communication with various kinds of external electronic devices via a communication network NW. An input signal such as image data and weights to be used by the CNN processing apparatus 1 may be received from an external server or the like via the communication interface 104.

The auxiliary storage device 105 is formed by a readable/writable storage medium and a driving device configured to read/write various kinds of information such as a program and data from/to the storage medium. In the auxiliary storage device 105, a hard disk or a semiconductor memory such as a flash memory can be used as the storage medium.

The auxiliary storage device 105 includes a storage area configured to store input data and weights acquired from the outside, and a program storage area configured to store a program used by the CNN processing apparatus 1 to execute arithmetic processing of the CNN such as a convolutional operation. The storage unit 16 described with reference to FIG. 1 is implemented by the auxiliary storage device 105. Also, for example, the auxiliary storage device 105 may include a backup area configured to back up the above-described data or program.

The input/output device 106 is formed by an I/O terminal that inputs a signal from an external device or outputs a signal to an external device. A display device (not shown) may be provided to display, via the input/output device 106, an operation result output by the CNN processing apparatus 1.

The program stored in the program storage area of the auxiliary storage device 105 may be a program configured to time-serially perform processing in accordance with the order of a CNN processing method to be described in this specification, or may be a program configured to perform processing in parallel or at a necessary timing such as the timing of invoking. The program may be processed by one computer, or may be distributedly processed by a plurality of computers.

[CNN Processing Method]

The outline of the operation of the CNN processing apparatus 1 having the above-described arrangement will be described next with reference to FIG. 3. First, the input buffer 10 and the weight buffer 11 temporarily store an input signal A and weights U given from a server or the like installed outside the CNN processing apparatus 1, respectively (step S1 and step S2).

The input signal A is vectorized input image data and has dimensions in the vertical direction and the horizontal direction. The value of the input signal A is expressed by, for example, a multi-digit value including a decimal point. On the other hand, a weight U is an element of a kernel represented by a matrix, and is a parameter adjusted, updated, and finally decided by learning of the CNN. The value of the weight U has dimensions in the vertical direction and the horizontal direction, and each element is expressed by, for example, a multi-digit value including a decimal point.

Next, the convolutional operation unit 12 reads out the input signal A and the weights U from the input buffer 10 and the weight buffer 11, respectively, and performs a convolutional operation (step S3). More specifically, the convolutional operation unit 12 multiplies the vector of the input signal A by the matrix of the weights U.

More specifically, the convolutional operation unit 12 slides the window of a preset filter of the CNN by a predetermined stride. The convolutional operation unit 12 multiplies an element of the weight U by a corresponding element of the input signal A in each place of the filter, and obtains the sum of products.

The convolutional operation unit 12 stores an operation result X of the convolutional operation by the product-sum operation in a corresponding place of the operation result buffer 13 (step S4).

After that, the processing unit 14 reads out the result X of the convolutional operation from the operation result buffer 13 and acquires an output Y of conversion-quantization processing of the operation result X by referring to the table 160 in the storage unit 16 (step S5). The acquired output Y is temporarily stored in the output buffer 15, read out by the processor 102, and output (step S6).

Note that well-known pooling processing may be performed, as needed, for the output Y acquired by the processing unit 14 (see non-patent literature 2). The output Y obtained in step S6 is input to a fully connected layer that forms a subsequent classifier (not shown), and the image data of the input signal A is discriminated.

As described above, the CNN processing apparatus 1 according to the present invention stores, in the storage unit 16, the table 160 which is configured to associate an input to conversion processing such as an ReLU and an output obtained by quantizing the value converted by the ReLU with each other. The CNN processing apparatus 1 acquires the output of conversion-quantization processing corresponding to the operation result of the convolutional operation by referring to the table 160. It is therefore possible to reduce the calculation load of the CNN processing apparatus 1 as compared to a case in which conversion processing such as an ReLU and quantization processing for the converted value are independently executed. Also, as a result, it is possible to speed up the signal processing of the CNN.

First Embodiment

As a detailed example of the CNN processing apparatus 1 having the above-described arrangement, a CNN processing apparatus 1 according to the first embodiment of the present invention will be described next. FIG. 4 is a block diagram showing the functional arrangement of a processing unit 14 of the CNN processing apparatus 1. The remaining components of the CNN processing apparatus 1 are the same as the components described with reference to FIG. 1. FIG. 5 is a view for explaining the data structure of a table 160. FIG. 6 is a view for explaining conversion-quantization processing by the processing unit 14.

[Functional Blocks of Processing Unit]

The processing unit 14 includes an input determination unit 140 and an output acquisition unit 141. The input determination unit 140 reads out the operation result of a convolutional operation from an operation result buffer 13, compares it with each preset input section of conversion-quantization processing, and determines an input section including the operation result of the convolutional operation, that is, the value of the input of the conversion-quantization processing.

The table 160 stored in the storage unit 16 stores data in which each of the input sections obtained by dividing the input of the conversion-quantization processing into a plurality of continuous sections and a value obtained by quantizing the value converted by the ReLU are associated with each other.

More specifically, as shown in FIG. 5, the table 160 stores data in which, for example, the input of conversion-quantization processing is divided into five sections, and each input section and the output of the conversion-quantization processing are associated with each other. For example, if an operation result X of the convolutional operation is "1", the input determination unit 140 determines, by comparison with each input section, that the operation result X corresponds to the input section "1≤X<2".

The output acquisition unit 141 acquires an output Y of conversion-quantization processing corresponding to the input section according to the determination result by the input determination unit 140 by referring to the table 160 stored in the storage unit 16.

More specifically, as shown in FIG. 6, the output acquisition unit 141 acquires the output Y of conversion-quantization processing corresponding to one of the five input sections determined by the input determination unit 140. In the example of conversion-quantization processing shown in FIG. 6, two arithmetic processes, that is, conversion processing by the ReLU and quantization processing by preset fraction processing are performed together.

[CNN Processing Method]

The operation of the CNN processing apparatus 1 according to this embodiment, which includes the above-described input determination unit 140, will be described next with reference to FIG. 3. Note that in the CNN processing method according to this embodiment, steps S1 to S4 are the same as the processing described in the outline of the CNN processing method.

First, an input buffer 10 and a weight buffer 11 temporarily store an input signal A and weights U given from a server or the like installed outside the CNN processing apparatus 1, respectively (step S1 and step S2).

Next, a convolutional operation unit 12 reads out the input signal A and the weights U from the input buffer 10 and the weight buffer 11, respectively, and performs a convolutional operation (step S3). More specifically, the convolutional operation unit 12 multiplies the vector of the input signal A by the matrix of the weights U.

Next, the convolutional operation unit 12 stores the operation result X of the convolutional operation by the product-sum operation in a corresponding place of the operation result buffer 13 (step S4).

After that, the processing unit 14 reads out the result X of the convolutional operation from the operation result buffer 13 and acquires the output Y obtained by conversion-quantization processing of the operation result X by referring to the table 160 in the storage unit 16 (step S5). More specifically, for the result X of the convolutional operation, that is, the input X of conversion-quantization processing, the input determination unit 140 compares the value for each preset input section of the conversion-quantization processing, and determines the input section including the value of the operation result X. After that, the output acquisition unit 141 acquires the output Y of conversion-quantization processing corresponding to the input section determined by the input determination unit 140 by referring to the table 160.

The acquired output Y is temporarily stored in an output buffer 15, read out by a processor 102, and output (step S6).

As described above, according to the CNN processing apparatus 1 of the first embodiment, which one of the plurality of continuous input sections of conversion-quantization processing includes the operation result of the convolutional operation, that is, the value of the input of the conversion-quantization processing is determined, and the output of the conversion-quantization processing is acquired by referring to the table 160 based on the determination result.

Hence, since the conversion processing such as an ReLU and the quantization processing of the operation result of the convolutional operation can be executed by determining the input section and referring to the table 160, it is possible to reduce the operation load of the CNN and suppress lowering of the processing speed even if embedded hardware is used.

In addition, the table 160 representing the input/output relationship of conversion-quantization processing is stored in a storage area of hardware such as an auxiliary storage device 105. For this reason, a neural network having a desired processing function can be implemented by hardware more flexibly by replacing values in the table 160 in accordance with the form of the neural network.

Second Embodiment

The second embodiment of the present invention will be described next. Note that in the following description, the same reference numerals as in the above-described first embodiment denote the same parts, and a description thereof will be omitted.

In the first embodiment, a case has been described in which the processing unit 14 includes the input determination unit 140, and the input determination unit 140 compares the operation result of the convolutional operation with the plurality of continuous input sections in conversion-quantization processing. In the second embodiment, however, a processing unit 14 includes a threshold processing unit (first threshold processing unit) 142 that performs threshold processing for the input of conversion-quantization processing. Components different from the first embodiment will mainly be described below.

[Functional Blocks of Processing Unit]

The processing unit 14 includes an output acquisition unit 141 and the threshold processing unit 142.

The threshold processing unit 142 reads out the operation result of a convolutional operation from an operation result buffer 13, and compares it with a threshold set in advance for an input of conversion-quantization processing.

As shown in FIG. 8, a table 160A in a storage unit 16 according to this embodiment stores data in which, for example, five thresholds are set for the input of conversion-quantization processing, and each threshold and the output of the conversion-quantization processing are associated with each other.

The threshold processing unit 142, for example, compares whether an operation result X of a convolutional operation is smaller than a set threshold or equal to or larger than a threshold. More specifically, if the operation result X of the convolutional operation is "1", the threshold processing unit 142 outputs a comparison result representing that the operation result X ("1") is smaller than a set threshold "2" and equal to or larger than a threshold "1".

The output acquisition unit 141 acquires an output Y of conversion-quantization processing corresponding to the threshold of the input according to the comparison result by referring to the table 160A based on the comparison result by the threshold processing unit 142. The output acquired by the output acquisition unit 141 is temporarily stored in an output buffer 15.

[CNN Processing Method]

The operation of a CNN processing apparatus 1 according to this embodiment, which includes the above-described threshold processing unit 142, will be described next with reference to FIG. 9. Note that in the CNN processing method according to this embodiment, steps S1 to S4 are the same as the processing described in the outline of the CNN processing method shown in FIG. 3.

First, an input buffer 10 and a weight buffer 11 temporarily store an input signal A and weights U given from a server or the like installed outside the CNN processing apparatus 1, respectively (step S1 and step S2).

Next, a convolutional operation unit 12 reads out the input signal A and the weights U from the input buffer 10 and the weight buffer 11, respectively, and performs a convolutional operation (step S3). More specifically, the convolutional operation unit 12 multiplies the vector of the input signal A by the matrix of the weights U.

Next, the convolutional operation unit 12 stores the operation result X of the convolutional operation by the product-sum operation in a corresponding place of the operation result buffer 13 (step S4).

After that, the processing unit 14 reads out the result X of the convolutional operation from the operation result buffer 13 and acquires the output Y obtained by conversion-quantization processing of the operation result X by referring to the table 160A in the storage unit 16 (step S5A). More specifically, the threshold processing unit 142 compares the result X of the convolutional operation with a threshold set in advance for an input of conversion-quantization processing, and outputs a threshold smaller than the operation result X. After that, the output acquisition unit 141 acquires the output Y corresponding to the threshold of the input output by the threshold processing unit 142 by referring to the table 160A.

The acquired output Y is temporarily stored in the output buffer 15, read out by a processor 102, and output (step S6).

As described above, according to the CNN processing apparatus 1 of the second embodiment, a threshold set in advance for an input to conversion-quantization processing and the table 160A which is configured to associate the threshold and an output of the conversion-quantization processing with each other are stored in the storage unit 16. In addition, the output acquisition unit 141 acquires the output of conversion-quantization processing based on the comparison result between the threshold and the operation result of the convolutional operation by referring to the table 160A.

For this reason, conversion processing by an ReLU or the like for the operation result of the convolutional operation and quantization processing of the operation result of the convolutional operation can be executed by threshold processing. Hence, if the output of the conversion-quantization processing monotonously increases or monotonously decreases, the output of the conversion-quantization processing can uniquely be decided by comparison with the threshold.

In particular, when the CNN processing apparatus 1 is implemented by predetermined hardware, comparison using an input section needs sequential processing, but comparison between the input and the threshold can be done at once. Hence, according to the CNN processing apparatus 1, it is possible to perform arithmetic processing of the CNN at a high speed even if embedded hardware is used.

Third Embodiment

The third embodiment of the present invention will be described next. Note that in the following description, the same reference numerals as in the above-described first and second embodiments denote the same parts, and a description thereof will be omitted.

In the second embodiment, a case has been described in which the threshold processing unit 142 performs comparison with a threshold processing unit set in advance for an input of conversion-quantization processing if the output of the conversion-quantization processing monotonously increases or monotonously decreases. In the third embodiment, however, based on division information for identifying an input section in which the output of conversion-quantization processing monotonously increases and an input section in which the output of conversion-quantization processing monotonously decreases, threshold processing is performed only in an input section to which the value of the input of the conversion-quantization processing belongs. Components different from the first and second embodiments will mainly be described below.

[Functional Blocks of Processing Unit]

A processing unit 14 includes an input determination unit 140, an output acquisition unit 141, and a threshold processing unit 142 (second threshold processing unit).

Based on division information for identifying an input section in which the output of conversion-quantization processing monotonously increases and an input section in which the output of conversion-quantization processing monotonously decreases, the input determination unit 140 determines an input section of conversion-quantization processing to which an operation result X of a convolutional operation by the operation unit belongs.

The threshold processing unit 142 compares the operation result X by a convolutional operation unit 12 with a plurality of thresholds set in advance for each input of conversion-quantization processing in the input section determined by the input determination unit 140, and outputs a threshold corresponding to the operation result X.

The output acquisition unit 141 acquires an output Y of conversion-quantization processing corresponding to the threshold output by the threshold processing unit 142 by referring to a table 160B stored in a storage unit 16.

The storage unit 16 stores the table 160B. As shown in FIG. 11, the table 160B stores data in which division information for identifying an input section in which the output of conversion-quantization processing monotonously increases and an input section in which the output of conversion-quantization processing monotonously decreases, a plurality of thresholds set in advance for each input of conversion-quantization processing, and outputs of conversion-quantization processing corresponding to the plurality of thresholds, respectively are associated with each other.

The division information includes, for example, information representing a vertex at which a monotonous increase and a monotonous decrease switch if an output obtained by further quantizing the operation result of a convolutional operation, which has undergone conversion processing such as an activation function, is formed by a section of the monotonous increase and a section of a monotonous decrease, like a quadratic function.

As shown in the example of FIG. 11, in the input/output relationship of conversion-quantization processing, the monotonous increase and the monotonous decrease of the output Y switch at the input X=6.

In the example of FIG. 11, for example, assume that the operation result X (input X) of the convolutional operation is smaller than "6" (X<6). In this case, the input determination unit 140 determines that the input X to conversion-quantization processing belongs to an input section in which the output monotonously increases.

[CNN Processing Method]

The operation of a CNN processing apparatus 1 according to this embodiment having the above-described arrangement will be described next with reference to FIG. 12. Note that in the CNN processing method according to this embodiment, steps S1 to S4 are the same as the processing described in the outline of the CNN processing method shown in FIG. 3.

First, an input buffer 10 and a weight buffer 11 temporarily store an input signal A and weights U given from a server or the like installed outside the CNN processing apparatus 1, respectively (step S1 and step S2).

Next, the convolutional operation unit 12 reads out the input signal A and the weights U from the input buffer 10 and the weight buffer 11, respectively, and performs a convolutional operation (step S3). More specifically, the convolutional operation unit 12 multiplies the vector of the input signal A by the matrix of the weights U.

Next, the convolutional operation unit 12 stores the operation result X of the convolutional operation by the product-sum operation in a corresponding place of an operation result buffer 13 (step S4).

After that, the processing unit 14 reads out the result X of the convolutional operation from the operation result buffer 13 and acquires the output Y obtained by conversion-quantization processing of the operation result X by referring to the table 160B in the storage unit 16 (step S5B).

More specifically, based on division information for identifying an input section in which the output of conversion-quantization processing monotonously increases and an input section in which the output of conversion-quantization processing monotonously decreases, the input determination unit 140 determines the input section to which the input X to conversion-quantization processing, that is, the operation result X of the convolutional operation belongs.

After that, the threshold processing unit 142 compares the operation result X (input X) of the convolutional operation and a threshold set in advance for the input X of conversion-quantization processing in the input section determined by the input determination unit 140, and outputs a threshold according to the comparison result. After that, the output acquisition unit 141 acquires the output Y of the conversion-quantization processing corresponding to the threshold output by the threshold processing unit 142 by referring to the table 160B.

The acquired output Y is temporarily stored in an output buffer 15, read out by a processor 102, and output (step S6).

As described above, according to the CNN processing apparatus 1 of the third embodiment, the section to which the input X of conversion-quantization processing belongs is determined based on division information for identifying an input/output section in which the output Y of conversion-quantization processing monotonously increases and an input/output section in which the output of conversion-quantization processing monotonously decreases. Threshold processing for the input X to conversion-quantization processing is performed in the determined input section, and the output Y of conversion-quantization processing is acquired by referring to the table 160B.

For this reason, even if the input/output relationship of conversion-quantization processing is not a monotonous increase or a monotonous decrease, threshold processing is performed for each of the sections of monotonous increase and monotonous decrease. It is therefore possible to perform arithmetic processing of the CNN at a higher speed.

The embodiments of the neural network processing apparatus, the neural network processing method, and the neural network processing program according to the present invention have been described above. However, the present invention is not limited to the above-described embodiments and various changes and modifications assumed by those skilled in the art can be made without departing from the scope of the appended claims of the present invention.

For example, in the above-described embodiments, a CNN has been described as an example of a neural network. However, the neural network employed by the neural network processing apparatus is not limited to the CNN.

Note that various functional blocks, modules, and circuits described in association with the embodiments disclosed here can be executed using a general-purpose processor, a GPU, a digital signal processor (DSP), an application specific integrated circuit (ASIC), an FPGA or another programmable logic device, a discrete gate or a transistor logic, a discrete hardware component, or a combination of some of the above-described devices designed to implement the above-described functions.

A microprocessor can be used as a general-purpose processor. Instead, a processor, a controller, a microcontroller, or a status device according to a conventional technique can also be used. The processor can also be implemented as, for example, a combination of a DSP and a microprocessor, a plurality of microprocessors, one or more microprocessors connected to a DSP core, or a combination of calculation devices that are arbitrary configurations.

EXPLANATION OF THE REFERENCE NUMERALS AND SIGNS

1 . . . . CNN processing apparatus, 10 . . . input buffer, 11 . . . weight buffer, 12 . . . convolutional operation unit, 13 . . . operation result buffer, 14 . . . processing unit, 15 . . . output buffer, 16 . . . storage unit, 101 . . . bus, 102 . . . processor, 103 . . . main storage device, 104 . . . communication interface, 105 . . . auxiliary storage device, 106 . . . input/output device, 160 . . . table, NW . . . communication network, U . . . weights, A . . . input signal.

The invention claimed is:

1. A neural network processing apparatus comprising:
a first memory configured to store an image data given to a neural network;
a second memory configured to store weights of the neural network;
an operation unit configured to perform a convolutional operation of the neural network including a product-sum operation of the image data and the weights;
a third memory configured to store a table which is configured to associate an input and an output of a conversion-quantization process with each other; and
a processing unit configured to acquire the output of the conversion-quantization process corresponding to an operation result of the convolutional operation by the operation unit;
wherein the conversion-quantization process includes:
a conversion process that converts an input value based on a predetermined condition to obtain a converted data having a bit precision, and
a quantization process that quantizes the converted data by reducing the bit precision of the converted data, and
the processing unit is configured to perform the conversion process and the quantization process together and the output of the conversion and quantization process is acquired by referring to the table.

2. The neural network processing apparatus according to claim 1, wherein
the table associates a plurality of input sections obtained by dividing the input of the conversion-quantization process into a plurality of continuous sections and the output of the conversion-quantization process with each other, and
the processing unit comprises:
an input determination unit configured to compare the operation result of the convolutional operation by the operation unit with the plurality of input sections and determine an input section including the operation result; and
an output acquisition unit configured to acquire the output of the conversion-quantization process corresponding to the input section according to a determination result of the input determination unit by referring to the table.

3. The neural network processing apparatus according to claim 1, wherein
the table associates a plurality of thresholds set in advance for the input of the conversion-quantization process and the output of the conversion-quantization process with each other, and
the processing unit comprises:
a first threshold processing unit configured to compare the operation result of the convolutional operation by the operation unit with the plurality of thresholds and output a threshold corresponding to the operation result; and
an output acquisition unit configured to acquire the output of the conversion-quantization process corresponding to the threshold output by the first threshold processing unit by referring to the table.

4. The neural network processing apparatus according to claim 2, wherein
the table associates division information for identifying an input section in which the output of the conversion-quantization process monotonously increases and an input section in which the output of the conversion-quantization process monotonously decreases, a plurality of thresholds set in advance for the input of the conversion-quantization process, and the output of the conversion-quantization process corresponding to each of the plurality of thresholds with each other,
the input determination unit determines, based on the division information, the input section of the conversion-quantization process to which the operation result of the convolutional operation by the operation unit belongs, and the processing unit comprises:
- a second threshold processing unit configured to compare the operation result of the convolutional operation by the operation unit with the plurality of thresholds in the input section determined by the input determination unit and output a threshold corresponding to the operation result; and
- an output acquisition unit configured to acquire the output of the conversion-quantization process corresponding to the threshold output by the second threshold processing unit by referring to the table.

5. The neural network processing apparatus according to claim 1, wherein
the neural network is a multilayer neural network including at least one intermediate layer.

6. The neural network processing apparatus according to claim 1, wherein
processing of converting the operation result of the convolutional operation by the operation unit based on the predetermined condition, which is included in the conversion-quantization process, includes at least one of decision of the operation result by an activation function and normalization of the operation result.

7. A neural network processing method comprising:
- a first step of storing an image data given to a neural network in a first memory;
- a second step of storing weights of the neural network in a second memory;
- a third step of performing a convolutional operation of the neural network including a product-sum operation of the image data and the weights;
- a fourth step of storing, in a third memory, a table which is configured to associate an input and an output of a conversion-quantization process with each other; and
- a fifth step of acquiring the output of the conversion-quantization process corresponding to an operation result of the convolutional operation in the third step by referring to the table, wherein the conversion-quantization process includes:
- a conversion process that converts an input value based on a predetermined condition, and
- a quantization process that quantizes the converted data by reducing a bit precision of the converted data, and
the fifth step of executing the conversion process and the quantization process together and the output of the conversion and quantization process is acquired by referring to the table.

8. A non-transitory computer-readable storage medium storing a neural network processing program configured to cause a computer to execute:
- a first step of storing an image data given to a neural network in a first memory;
- a second step of storing weights of the neural network in a second memory;
- a third step of performing a convolutional operation of the neural network including a product-sum operation of the image data and the weights;
- a fourth step of storing, in a third memory, a table which is configured to associate an input and an output of conversion-quantization process with each other; and
- a fifth step of acquiring the output of the conversion-quantization process corresponding to an operation result of the convolutional operation in the third step by referring to the table, wherein the conversion-quantization process comprising:
- a conversion process that converts an input value based on a predetermined condition, and
- a quantization process that quantizes the converted data by reducing a bit precision of the converted data, and
the fifth step of executing the conversion process and the quantization process together and the output of the conversion and quantization process is acquired by referring to the table.

* * * * *